(12) United States Patent
Leuallen

(10) Patent No.: US 8,870,637 B1
(45) Date of Patent: Oct. 28, 2014

(54) FOLDABLE FILLETING BOARD

(76) Inventor: Steve C. Leuallen, Parachute, CO (US)

( * ) Notice: Subject to any disclaimer, the term of this patent is extended or adjusted under 35 U.S.C. 154(b) by 334 days.

(21) Appl. No.: 13/280,425

(22) Filed: Oct. 25, 2011

(51) Int. Cl.
*A22C 25/08* (2006.01)

(52) U.S. Cl.
USPC .......................................................... 452/195

(58) Field of Classification Search
USPC ..................... 452/185, 194–196; 99/537, 538; 83/167, 130; 220/522, 507
See application file for complete search history.

(56) References Cited

U.S. PATENT DOCUMENTS

| | | |
|---|---|---|
| 2,607,070 A | 8/1952 | McCourtie |
| 2,725,592 A * | 12/1955 | Pieper ............................ 452/195 |
| 2,741,061 A | 4/1956 | William |
| 3,177,523 A | 4/1965 | Andrew |
| 4,454,630 A | 6/1984 | Shouldis |
| 4,531,260 A | 7/1985 | Klamm |
| 4,815,169 A * | 3/1989 | Valleau ........................... 452/161 |
| D326,211 S * | 5/1992 | Allen .............................. D7/698 |
| 5,116,279 A * | 5/1992 | Perry .............................. 452/195 |
| 5,551,558 A * | 9/1996 | Bureau ........................... 206/223 |
| 5,944,596 A | 8/1999 | Hargrove |
| 6,942,562 B2 | 9/2005 | Kallas |
| 6,971,644 B1 * | 12/2005 | Kennedy et al. ........... 269/289 R |

* cited by examiner

*Primary Examiner* — Richard Price, Jr.
(74) *Attorney, Agent, or Firm* — Kyle A. Fletcher, Esq.

(57) ABSTRACT

The foldable filleting board is comprised of a first member hingedly engaged to a second member that can both fold flat to form a filleting board surface. The first member and the second member can fold close to form a container for the storage of utensils and objects associated with filleting a fish. A filleting knife, a sharpening stone, and clamp are provided and can be secured along an interior surface of either member between uses. The clamp is used to clamp the head of a fish for filleting purposes. A tray is included within the container, and may be removed for placement of fillets, or waste generated from filleting. The first member and the second member include a magnetic closure that seals close the container formed there between, and which is operable in cold or wet conditions.

10 Claims, 5 Drawing Sheets

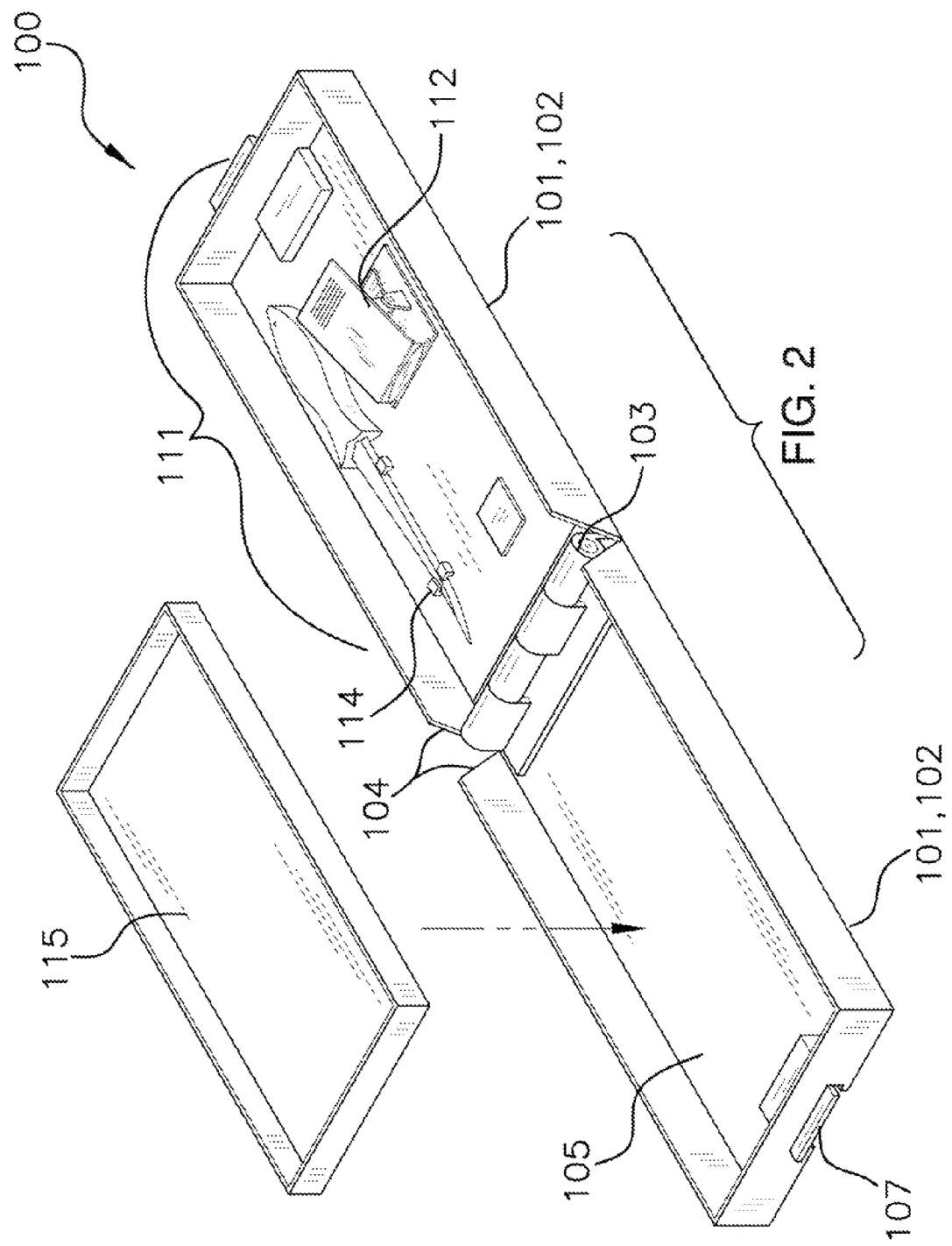

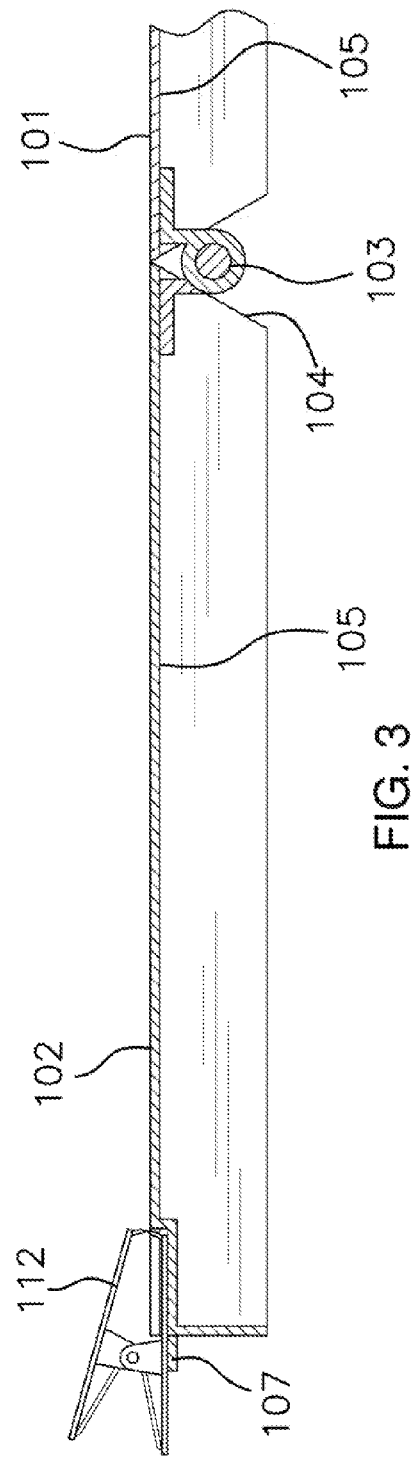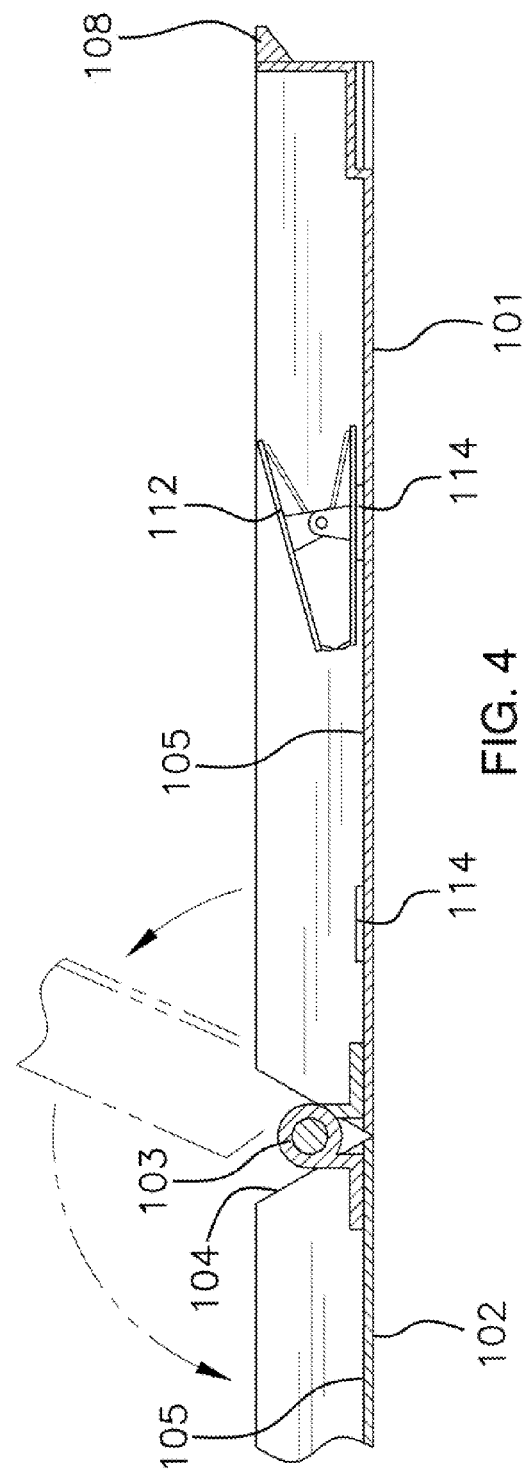

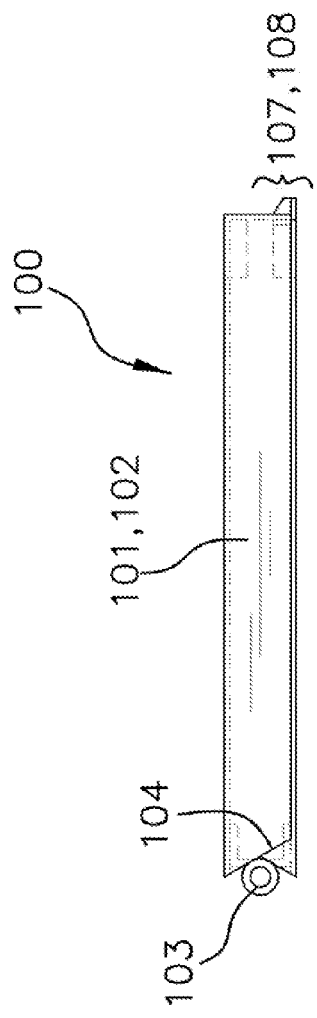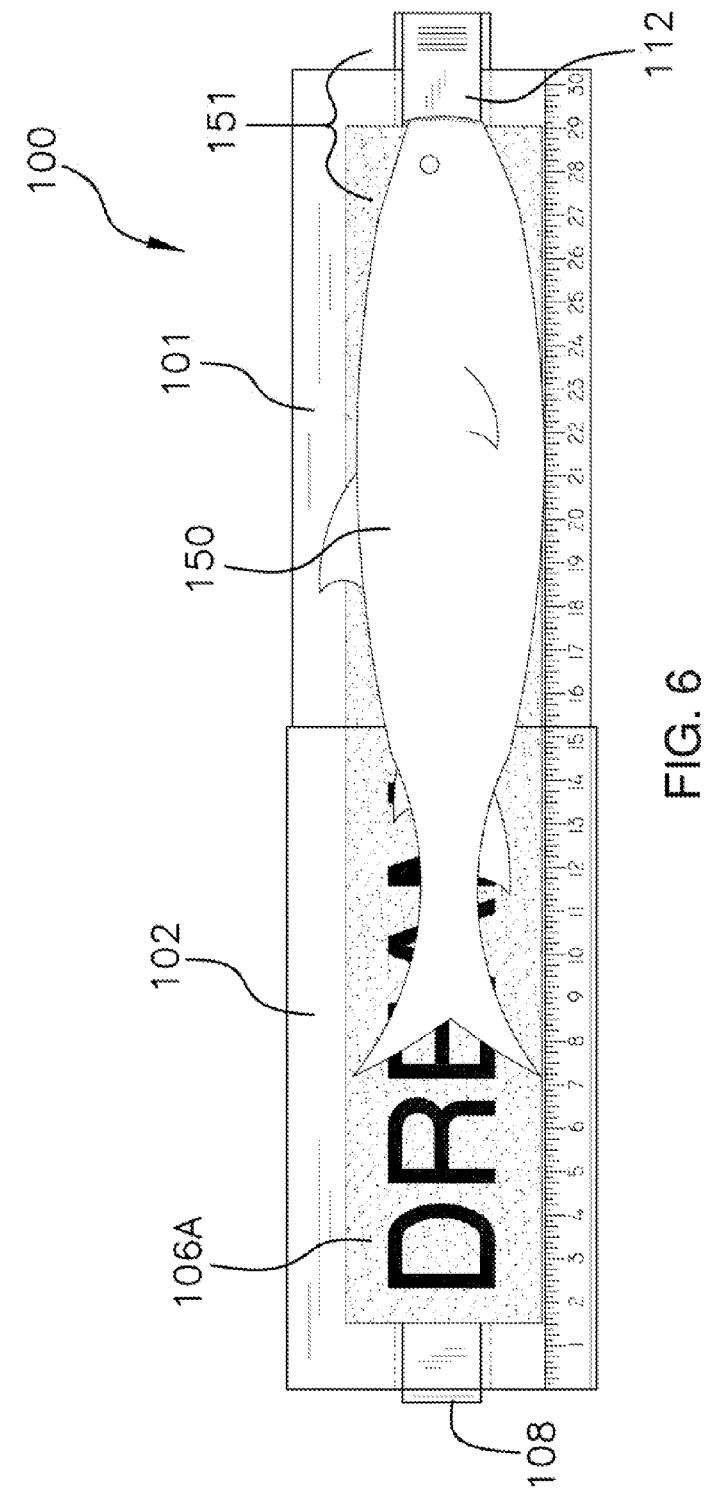

FOLDABLE FILLETING BOARD

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of filleting devices, more specifically, a filleting board that is foldable and of which provides multiple additional features.

Portable filleting mechanisms have been provided, and fulfill their respective objectives. However, shortcomings are apparent in that no such device offers the flexibility in use, storage capabilities for objects and utensils associated with filleting a fish, and which is foldable between uses. The device of the present application seeks to overcome the shortcomings in the prior art by providing a foldable fish filleting board that is easy to use, and offers flexibility in use as well as the objects and utensils needed when filleting a fish.

B. Discussion of the Prior Art

As will be discussed immediately below, no prior art discloses a foldable filleting board comprised of a first member hingedly attached to a second member that when folded flat form the filleting board; whereupon the first member and the second member fold close to form a cavity within which is stored utensils and objects associated with filleting; whereupon opening of the first member and the second member, a removable tray is provided as a receptacle for placement of bones and other debris extracted upon filleting or for placement of fillets thereon; wherein a clamp, sharpening stone, and filleting knife are secured along an inner surface of either the first or second member and may be removed for use in conjunction with filleting; wherein the clamp is ideally suited for securing the head of a fish to the filleting board; wherein the filleting board includes a magnetic closure as the means of closing the first member to the second member.

The Valleau (U.S. Pat. No. 4,815,169) discloses a fish filleting device with a pair of clamping plates and includes a cutting knife. However, the fish filleting device does not feature two members hingedly engaged and closeable via a magnetic closure and which folds flat and upon which a clamp may secure a head of a fish for filleting thereon.

The Harrison et al. (U.S. Pat. No. 2,741,061) discloses a tray with a clamp for holding and cleaning fish. However, the device is provided to assist in the extraction of a hook from a mouth of a fish, and not in filleting of said fish.

The Hargrove (U.S. Pat. No. 5,944,596) discloses a fish scaling device with a slide out drawer. Again, the device is directed to scaling of a fish, and not to filleting a fish and storage of utensils or objects associated there with.

The Perry (U.S. Pat. No. 5,116,279) discloses a hinged and folding fish cleaning device. Again, the cleaning device is not capable of storing utensils and objects used to clamp and fillet a fish upon a foldable filleting board including magnetized closure means that work regardless of temperature or surface conditions.

The Kallas (U.S. Pat. No. 6,942,562) discloses a fish cleaning device that includes a clamp securing member. However, the device does not provide a compartment for storage of utensils and objects used for filleting.

The Klamm (U.S. Pat. No. 4,531,260) discloses a fish filleting kit. However, the filleting kit does not provide a magnetized closure for securing closed hingedly attached members forming a cavity for storage of objects and utensils useful in filleting a fish thereon.

The Shouldis (U.S. Pat. No. 4,454,630) discloses a fish cleaning device with a folding housing structure. Again, the device is not specifically suited for storage of objects and utensils used to fillet a fish upon a filleting board that can fold close when not in use.

The Andersen et al. (U.S. Pat. No. 3,117,523) discloses a fish cleaning board holder, which does not disclose a foldable filleting board structure that can house or store objects and utensils between use in filleting of a fish thereon.

The Detroit et al. (U.S. Pat. No. 2,607,070) discloses a device for cleaning fish and game. Again, the device does not double as a container for storage of items used to clamp and fillet a fish atop a filleting board structure, which is foldable.

The Seeber et al. (U.S. Pat. No. Des. 168,600) illustrates a design for a fish scaling clamp and board. Again, the clamp and board is not a container that closes and folds up the filleting board when no longer in use, and which stores objects and utensils associated with filleting of a fish.

While the above-described devices fulfill their respective and particular objects and requirements, they do not describe a foldable filleting board comprised of a first member hingedly attached to a second member that when folded flat form the filleting board; whereupon the first member and the second member fold close to form a cavity within which is stored utensils and objects associated with filleting; whereupon opening of the first member and the second member, a removable tray is provided as a receptacle for placement of bonds and other debris extracted upon filleting or for placement of fillets thereon; wherein a clamp, sharpening stone, and filleting knife are secured along an inner surface of either the first or second member and may be removed for use in conjunction with filleting; wherein the clamp is ideally suited for securing the head of a fish to the filleting board; wherein the filleting board includes a magnetic closure as the means of closing the first member to the second member. In this regard, the foldable filleting board departs from the conventional concepts and designs of the prior art.

SUMMARY OF THE INVENTION

The foldable filleting board is comprised of a first member hingedly engaged to a second member that can both fold flat to form a filleting board surface. The first member and the second member can fold close to form a container for the storage of utensils and objects associated with filleting a fish. A filleting knife, a sharpening stone, and clamp are provided and can be secured along an interior surface of either member between uses. The clamp is used to clamp the head of a fish for filleting purposes. A tray is included within the container, and may be removed for placement of fillets, or waste generated from filleting. The first member and the second member include a magnetic closure that seals close the container formed there between, and which is operable in cold or wet conditions. The foldable filleting board surface features an anti-skid surface that aids in securing a fish thereon.

It is an object of the invention to provide a foldable fish filleting board that can fold flat when in use.

A further object of the invention is to provide a fish-filleting surface that includes an anti-skid surface to aid in supporting a fish thereon for filleting purposes.

A further object of the invention is to provide a clamp that can secure the fish head to an end of the filleting board surface.

A further object of the invention is to provide two members hingedly engaged and which close to form a container for storage of utensils and objects therein.

A further object of the invention is to provide a filleting knife, sharpening stone, and removable tray that in addition to the clamp are secured or stored within the container formed of the members.

An even further object of the invention is to use magnetic means to secure the filleting knife, the clamp, and the sharpening stone to an interior surface of either member when not in use.

A further object of the invention is to provide a foldable filleting board that includes a magnetic closure to secure close the container formed of the members regardless of ambient conditions.

These together with additional objects, features and advantages of the foldable filleting board will be readily apparent to those of ordinary skill in the art upon reading the following detailed description of presently preferred, but nonetheless illustrative, embodiments of the foldable filleting board when taken in conjunction with the accompanying drawings.

In this respect, before explaining the current embodiments of the foldable filleting board in detail, it is to be understood that the foldable filleting board is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the foldable filleting board.

It is therefore important that the claims be regarded as including such equivalent construction insofar as they do not depart from the spirit and scope of the foldable filleting board. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2 illustrates a bottom perspective view of the foldable filleting board in a flattened orientation in which the utensils are secured to an interior surface of one of the two members and the removable tray is aligned adjacent to an opposing member;

FIG. 3 illustrates a side profile detail of the hinge and magnetic closure used to support and secure close the members;

FIG. 4 illustrates a side profile of the foldable filleting board and detailing the rotation of one member with respect to an opposing member via the hinge, and further detailing the magnetic means used to secure the utensils and clamp to an interior surface of one of the two members;

FIG. 5 illustrates a side profile of the foldable filleting board in a closed position;

FIG. 6 illustrates a top view of the fish filleting board in a flattened position in which a fish is placed atop the filleting surface and the fish head is secured thereon via a clamp.

DETAILED DESCRIPTION OF THE EMBODIMENT

Figure 1:
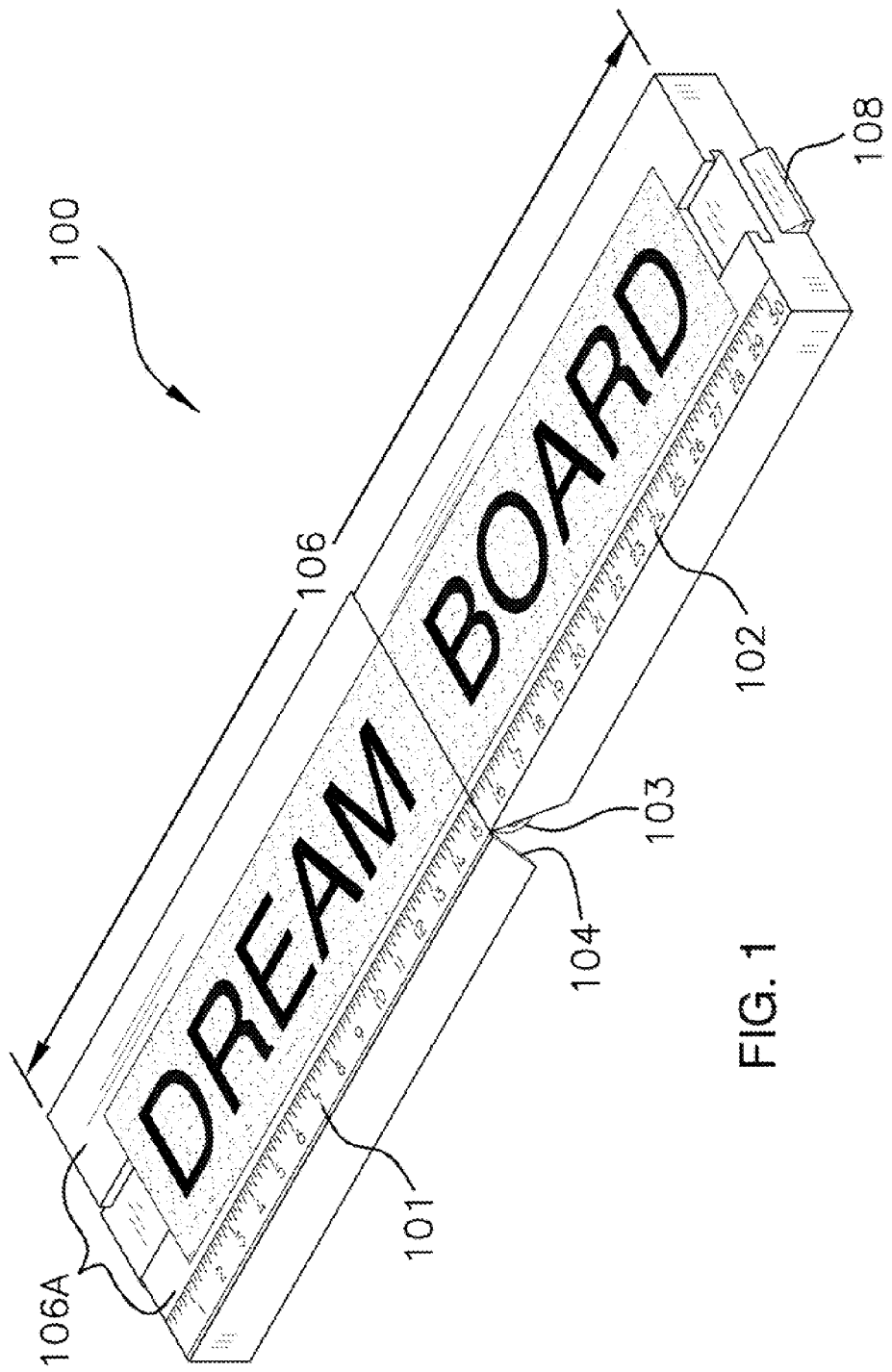
FIG. 1 illustrates a perspective view of the foldable filleting board in a flattened orientation and detailing the anti-skid surface along the top of the filleting surface: along with a magnetic closure on a distal end of one of the members.

The following detailed description is merely exemplary, in nature and is not intended to limit the described embodiments of the application and uses of the described embodiments. As used herein, the word "exemplary" "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A foldable filleting board 100 (hereinafter invention) includes a first member 101 and a second member 102 that are attached to one another via a hinge 103. It shall be noted that the hinge 103 has a rotational range of 180 degrees such that the first member 101 shall fold to a flattened state with respect to the second member 102 (see FIG. 1) or a closed state (see FIG. 3).

It shall be further noted that both the first member 101 and the second member 102 have indentations 104 that enable the hinge 103 to rotate the invention 100 from the flattened state (see FIG. 1) to the closed state (see FIG. 3), and vice versa.

The first member 101 and the second member 102 are lipped members that when aligned to form the closed state (see FIG. 3), shall form a container within which items may be stored between use of the invention 100. The first member 101 and the second member 102 both include an interior surface 105. It shall be noted that the exterior surface of both the first member 101 and the second member 102 form a filleting surface 106 of the invention 100.

The invention 100 includes utensils 110 that may be stored within the container (see FIG. 3) when not in use in filleting a fish 150 upon the filleting surface 106. The utensils 110 include a filleting knife 111, a clamp 112, and a sharpening stone 113. The utensils 110 are secured to the interior surface 105 via a securing means 114 comprised of either brackets or magnets (see FIGS. 2 and 4). A removable tray 115 is included with the invention 100 and shall be stored within the container (see FIG. 3) adjacent the utensils 110. The removable tray 115 is provided with the invention 100 as an article used to either store fillets or waste produced in the filleting process.

The first member 101 includes a closure lip 107 on a distal end of the first member 101; whereas the second member 102 includes a magnetic closure 108 on a distal end. The magnetic closure 108 works in conjunction with the closure lip 107 to secure the invention 100 in a closed state (see FIG. 3). The magnetic closure 108 is made of a magnetic material whereas the closure lip 107 is made of a material comprising a ferrous material or a magnetic material.

Figure 1A:
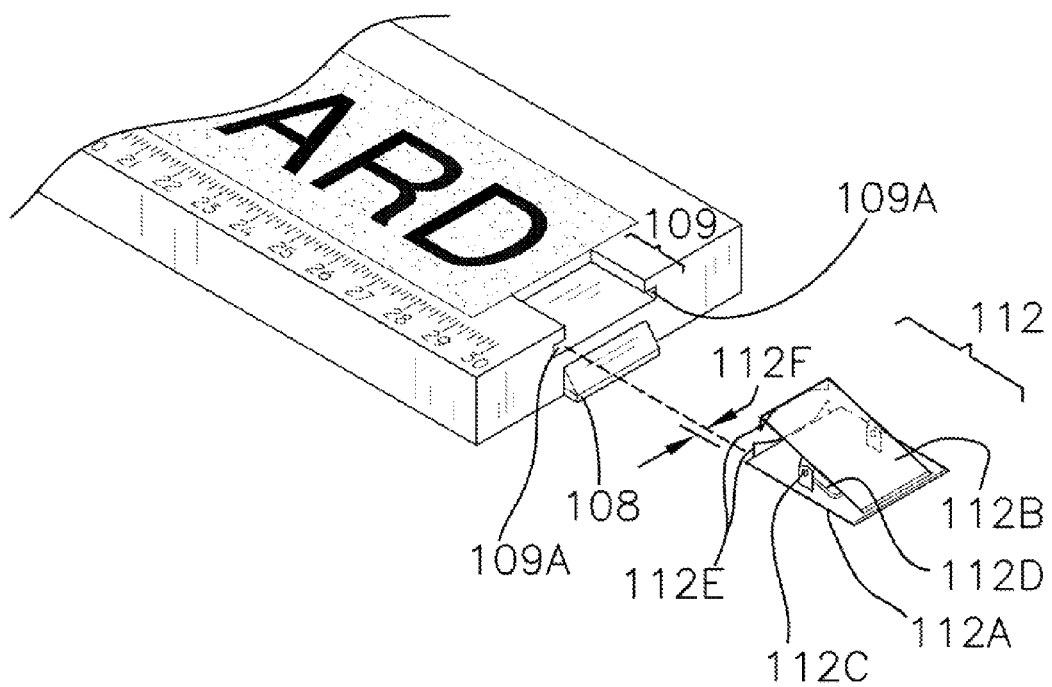
FIG. 1A details the inset provided at distal ends of the filleting surface, and into which the clamp is slideably secured thereto.

Referring to FIG. 1A, each end of the filleting surface 106 is provided with an inset 109. The inset 109 are provided at opposing ends of the filleting surface 106 in order to enable the clamp 112 a means of securing itself to the filleting surface 106. It shall be noted that both the first member 101 and the second member 102 include the inset 109 thereon.

The inset 109 includes two grooved tracks 109A into which a bottom portion 112A of the clamp 112 slides in between. It shall be further noted that the clamp 112 includes a top portion 112B that rotates relative the bottom portion 112A via a pivot point 112C that includes a spring 112D. Both the top portion 112B and the bottom portion 112A include teeth 112E. In particular, to the bottom portion 112A a shoulder 112F on opposing sides of the teeth 112E. The shoulders 112F slide into the grooved tracks 109A of the inset 109 in order to secure the clamp 112 to the filleting surface 106 while the top portion 112B is free to rotate in order to clamp a fish head 151 of the fish 150 to the filleting surface 106.

Adorning the filleting surface 106 is a non-skid surface 106A, which is used to provide traction to the fish 150 placed thereon. The non-skid surface 106A shall have an area that is less than the area of the filleting surface 106.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A foldable filleting board comprising:
a first member hingedly engaged to a second member and when folded close shall form a container for the storage of objects and utensils associated with filleting a fish;
wherein the first member and the second member fold flat to form a filleting surface upon which a fish is configured to be placed for filleting;
wherein the hinge has a rotational range of 180 degrees;
wherein the first member and the second member each have indentations that enable the hinge to rotate from a closed state to a flattened state, and vice versa;
wherein the first member and the second member are lipped members that when aligned to form the closed state, shall form said container;
wherein the first member and the second member both include an interior surface; wherein an exterior surface of both the first member and the second member form the filleting surface;
wherein the utensils comprise a filleting knife, a sharpening stone, and a clamp;
wherein at least one end of the filleting surface is provided with an inset, which enables the clamp to secure itself to the filleting surface while being configured to enable a fish head to be clamped to said filleting surface.

2. The foldable filleting board as described in claim 1 wherein the utensils are secured to the interior surface of one of the two members via securing means comprising either brackets or magnets.

3. The foldable filleting board as described in claim 1 wherein a removable tray is included and is stored within the container adjacent the utensils.

4. The foldable filleting board as described in claim 1 wherein the first member includes a closure lip on a distal end of the first member; wherein the second member includes a magnetic closure on a distal end; wherein the magnetic closure attracts to the closure lip to form the closed state.

5. The foldable filleting board as described in claim 1 wherein the inset includes two grooved tracks into which a bottom portion of the clamp slides in between whereas a top portion of said clamp is free to rotate via a pivot point formed therein.

6. The foldable filleting board as described in claim 1 wherein the filleting surface includes a non-skid surface thereon.

7. A foldable filleting board comprising:
a first member hingedly engaged to a second member and when folded close shall form a container for the storage of objects and utensils associated with filleting a fish;
wherein the first member and the second member fold flat to form a filleting surface upon which a fish is configured to be placed for filleting;
wherein the first member and the second member both include an interior surface; wherein an exterior surface of both the first member and the second member form the filleting surface;
wherein the hinge has a rotational range of 180 degrees; wherein the first member and the second member each have indentations that enable the hinge to rotate from a closed state to a flattened state, and vice versa;
wherein the first member and the second member are lipped members that when aligned to form the closed state, shall form said container;
wherein the utensils comprise a filleting knife, a sharpening stone, and a clamp; wherein the utensils are secured to the interior surface of one of the two members via securing means comprising either brackets or magnets; wherein a removable tray is included and is stored within the container adjacent the utensils;
wherein at least one end of the filleting surface is provided with an inset, which enables the clamp to secure itself to the filleting surface while being configured to enable a fish head to be clamped to said filleting surface.

8. The foldable filleting board as described in claim 7 wherein the first member includes a closure lip on a distal end of the first member; wherein the second member includes a magnetic closure on a distal end; wherein the magnetic closure attracts to the closure lip to form the closed state.

9. The foldable filleting board as described in claim 7 wherein the inset includes two grooved tracks into which a bottom portion of the clamp slides in between whereas a top portion of said clamp is free to rotate via a pivot point formed therein.

10. The foldable filleting board as described in claim 7 wherein the filleting surface includes a non-skid surface thereon.

* * * * *